United States Patent Office 2,905,635
Patented Sept. 22, 1959

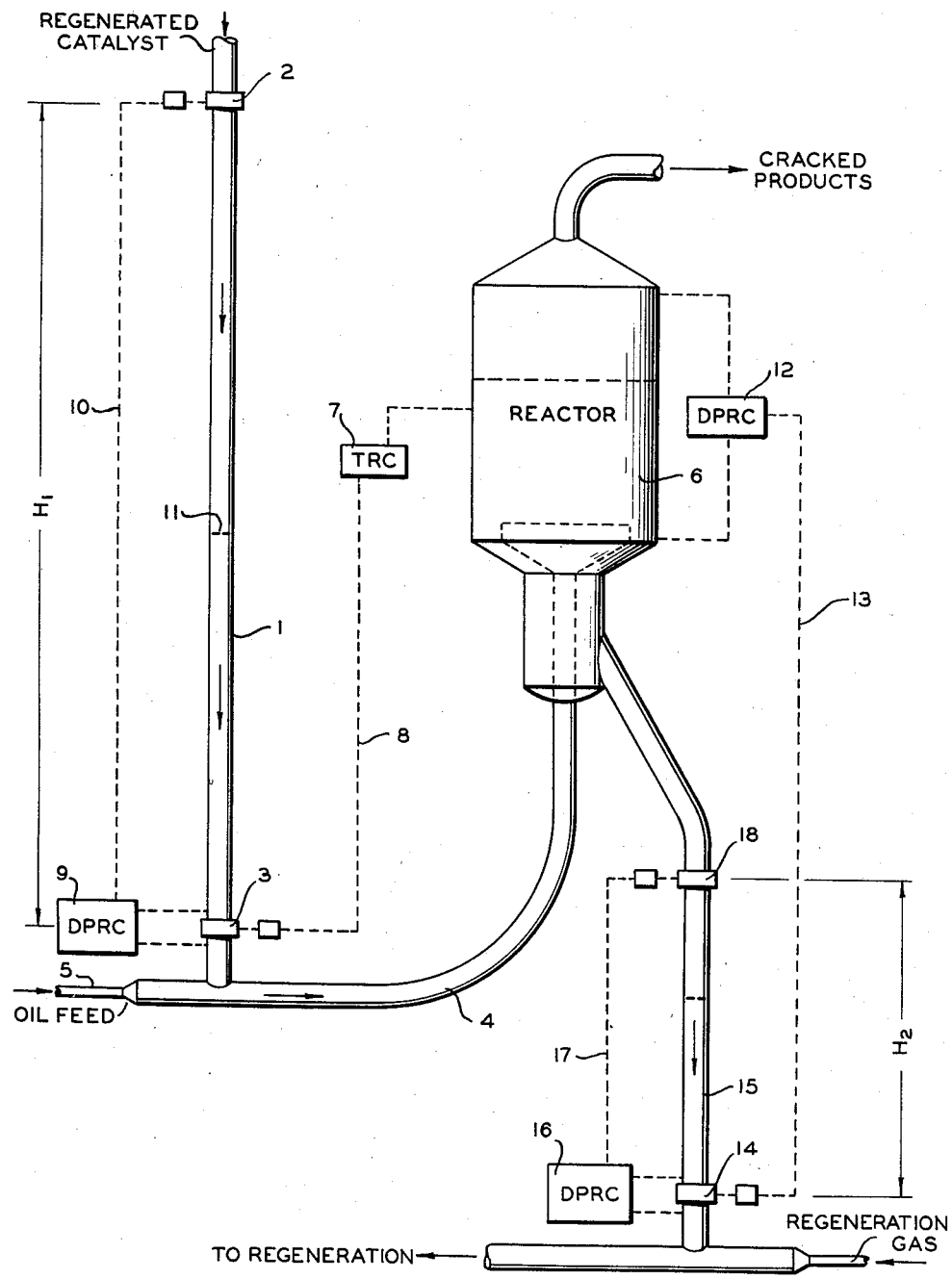

2,905,635

FLUIDIZED SOLIDS TRANSFER WITH A VALVE EROSION REDUCTION METHOD AND APPARATUS

Kenneth A. Harper, Bartlesville, Okla., assignor to Phillips Petroleum Company, a corporation of Delaware Application May 25, 1954, Serial No. 432,278

7 Claims. (Cl. 208—164)

This invention relates to a method and to an apparatus for the reduction of the erosion by a fluid of a valve or a flow control regulator means. In one of its aspects, the invention relates to a method in which the erosion of a variable flow control regulator means due to the pressure drop of a fluid flowing therethrough is controlled by controlling the quantity of fluid flowing toward said variable flow control regulator means up-stream thereof responsive to the pressure drop across said variable flow control regulator means. In another of its aspects, the invention relates to an apparatus comprising in combination a conduit for conveying a fluid, a first variable flow control regulator means disposed in said conduit, a second variable flow control regulator means disposed in said conduit up-stream of said first variable flow control regulator means, and means to control said second variable flow control regulator means responsive to the pressure drop across said first variable flow control regulator means. In a further aspect of the invention, it relates to a method for controlling the erosion of a first valve disposed in a standpipe conveying fluidized catalyst at adjustable rates of flow which comprises disposing a second valve above said first valve in said standpipe, said second valve being adapted to regulate downward flow therethrough of said fluidized catalyst and to maintain below it and above said first-mentioned valve a level of dense phase fluidized catalyst such that the pressure drop across said first-mentioned valve is maintained below a predetermined maximum and operating said second valve responsive to the pressure drop across said first-mentioned valve. A still further aspect of the invention is seen in the combination of a fluidized reactor-regenerator combination in which the flow of catalyst from the regenerator is through a standpipe having a first and second valve therein, as above described, the upper valve being operated as described, the lower valve being operated responsive to a condition in the reactor, the reactor having a standpipe equipped with valves as above described, the upper valve of which is operated as above described, and the lower valve of which is operated responsive also to a condition in said reactor. In a more specific aspect of the invention, the conditions in said reactor are the temperature of the reactor contents and the differential of pressure existing between two different levels in said reactor, respectively.

Other aspects as well as the objects and the advantages of the invention are apparent from this disclosure, the drawing, and the appended claims to the invention.

It has now been found that the erosion of a slide valve, or equivalent means, in a standpipe conducting fluidized solids from a regenerator, a reactor or other vessel, can be substantially minimized or eliminated at variable rates of flow through said valve by maintaining at a substantial height above said first-mentioned valve a second valve which is operated to control a dense phase of catalyst above said first valve but below said second valve to a level such that the pressure differential across said first-mentioned valve is maintained substantially constant, the said second valve being operated responsive to the pressure differential across said first-mentioned valve. It will be noted that while the pressure differential is maintained substantially constant below a predetermined maximum value, the flow through said first-mentioned valve can be varied or can occur at variable rates. The second valve is not subject to as high a pressure differential as is the first valve because it is placed at a substantially higher level than said first-mentioned valve. Further, because the dense phase maintained above said first-mentioned valve but below said second-mentioned valve is in a sense independent from the dense phase maintained above said second-mentioned valve which acts to allow to pass through itself only so much of the dense phase above it as is required to maintain the required level of dense phase below it, variations of density in the dense phase above said second valve and, therefore, even in the vessel leading to the said second valve, can no longer influence said first-mentioned valve. Yet, the flow through said second-mentioned valve will be such that a desired weight of catalyst particles will be passed therethrough.

From the foregoing and from that which follows, as well as a consideration of the drawing, one skilled in the art in possession of this disclosure will be able, without more, to readily visualize the manifold application to which the invention in any of its broader aspects is applicable. Therefore, for purposes of a detailed description, there will now be described a preferred somewhat more specific embodiment of the invention as it is applied to a fluidized catalytic operation, for example, a hydrocarbon conversion operation.

The drawing shows a standpipe leading from a catalyst supply source, in this specific embodiment, a regenerator, not shown, but located at a level substantially above that of a reactor which is shown and from which regenerator fluidized catalyst is conducted to said reactor; and a standpipe communicating with said reactor through which so-called spent catalyst is conveyed to a conduit for its return to said regenerator or discard as the case may be.

Referring now to the drawing, in standpipe 1 there are disposed variable flow controlling valves 2 and 3. Regenerated catalyst flows down through valve 2 and through valve 3 into transfer pipe 4 into which an oil (or mixture of oil and vapor) which vaporizes upon contacting catalyst in pipe 4, is introduced at 5. The oil (or mixture of oil and vapor) commingles with catalyst emerging from the foot of a standpipe 1 and the commingled mixture rises into reactor 6 in which conversion of the hydrocarbon occurs. Depending upon the many variables which must be controlled and which are more or less successfully controlled in such an operation, the temperature of the reactor contents, specifically the reactor bed or dense phase mixture of hydrocarbons and catalyst particles, tends to vary and is in this embodiment controlled by adjusting valve 3 by means of temperature recorder controller 7 which is operatively connected by means indicated by dotted line 8 with valve 3 so that a greater or lesser quantity of hot regenerated catalyst is admixed with the oil entering into transfer pipe 4. Thus, for example, if the temperature in reactor 6 should tend to fall undesirably, the combination of temperature recorder controller 7 and valve 3 will act to admix more catalyst into the oil entering into transfer pipe 4. The temperature in reactor 6 can fall undesirably, for example, in the event of a sudden surge of more than a desired flow of oil into transfer pipe 4. Also, but by no means inclusive of all of the possibilities which lead to a variation of temperature in reactor 6, are variation of the temperature of the entering oil and variation of the temperature of the regenerated catalyst for some reason which is not necessary here to specify. The pressure drop across valve 3 is desirably maintained at a certain minimum value since obviously it is desired to cause catalyst to flow from the standpipe into transfer pipe 4 and to therein properly commingle with the oil or mixture of oil and vapors. However, it will be seen that a rapid rate of flow through valve 3 will tend to decrease the pressure drop across said valve (due to lowering of level 11) in which event this condition is immediately alleviated by action of differential pressure recorder controller 9 which is operatively connected by linkage 10 to valve 2 which causes valve 2 to open somewhat, thus increasing the height of the level 11 of the dense phase in pipe 1. However, depending upon whichever factor outweighs the other, if the temperature of the catalyst-oil mixture in reactor 6 rises above a predetermined maximum temperature, temperature recorder controller 7 will operate to close valve 3, which upon being partially closed, will cause the level 11 of the dense phase in pipe 1 to rise, tending to build up the pressure ahead of valve 3 to cause an increased pressure differential across valve 3 whereupon differential pressure recorder controller 9 will act to throttle valve 2 to decrease the flow of catalyst into the portion of the standpipe above the level of the dense phase above valve 3 to maintain substantially constant the differential pressure across valve 3 which in this example is in the range 3–4 pounds per square inch. The pressure below valve 3 is dependent upon reactor operating conditions as well as the pressure of the oil vapor passed into pipe 4. It is, of course, dependent upon the pressure above valve 3 as will be understood by those skilled in this art. In any event, as the flow of catalyst to reactor 6 is decreased as when seeking to lower the temperature therein, the bed level in the reactor will tend to lower. To maintain the level of the bed in the reactor constant, differential pressure recorder controller 12 is caused to operate through control mechanism indicated by dotted line 13 to throttle valve 14 at the base of standpipe 15. The decrease of the flow of catalyst therefrom, as valve 14 is closed, the level of the dense bed in the reactor standpipe 15 begins to rise and increases the pressure above valve 14, thereby increasing the pressure differential across valve 14 to above the, in this example, desired 3 to 4 pounds per square inch which immediately causes differential pressure recorder controller 16 to operate through mechanism indicated by dotted line 17 upon valve 18 to partially close valve 18, thereby decreasing the flow of catalyst into the dense phase in pipe 15 below valve 18 and above valve 14, thus to maintain the pressure differential across valve 14 at the desired value. Of course, it is clear that the reactor level is thus maintained at the desired height.

In the event it is desired for some reason to change the conditions of operation within the regenerator, not shown, or within reactor 6 and such change will tend to decrease or increase the differential pressure across valves 3 and/or 14, it is clear that valves 2 and 18 will be operated to maintain the desired pressure differential below a predetermined maximum and/or above a predetermined minimum, as desired.

Specifically, and as an important feature of this invention, the location of a valve such as valve 2 and/or the location of a valve such as valve 18 in a pipe conveying fluidized solids, as described, should be at a distance H feet above the lower valve, in the example valve 3 or valve 14, the said distance of H feet being determined from the formula $$H = \frac{144(S-G)}{D}$$

wherein S is the pounds per square inch pressure drop across the lower valve, before installation of the upper valve, D is the density of the dense phase fluidized solid in the standpipe in pounds per cubic foot, 144 is a factor to convert square feet to square inches (pounds per square inch to pounds per square foot) for dimensional consistency, and G is a minimum differential pressure in pounds per square inch across the upper valve with the lower valve open.

Thus, if $S=12$ pounds per square inch, $D=36$ pounds per cubic foot, and $G=2$, H will equal 40, or the upper valve is placed 40 feet above the conventional lower valve to maintain control of the dense bed height in the standpipe above the lower valve to control the pressure differential across the lower valve.

While variable flow control valves have been described specifically as slide valves, it is clear that means equivalent to said valve are within the scope of the appended claims and are intended to be included within the term "valve" which it is intended be given its broadest meaning herein and in the claims.

Those skilled in the art will understand that in the specific embodiment of the invention which has been described, details of operation within the skill of those versed in this art have been omitted together with details of apparatus. Thus, for example, it is known that fluidizing gases can be and ordinarily are introduced into standpipes, that stripping gases are employed to strip spent catalyst of hydrocarbons before the catalyst is passed to regeneration, etc.

Reasonable variation and modification are possible within the scope of the foregoing disclosure, drawing, and the appended claims to the invention, the essence of which is that the erosion of a variable flow control regulator means by a fluid passing therethrough is substantially minimized by providing upstream of said variable flow control regulator another variable flow control regulator operated responsive to the pressure differential across said first-mentioned variable flow control regulator; that a formula has been set forth for calculating the height above said first-mentioned variable flow control regulator at which to position the second-mentioned variable flow control regulator; and that more specifically, as described, there have been set forth a method and an apparatus for effectuating the aforesaid control of erosion, still more specifically as these have been disposed in combination with a regenerator and reactor combination conventionally employed in the art to convert hydrocarbons in the presence of a fluidized catalyst in which the reactor level and/or the level in the regenerator are controlled, for example, by a temperature recorder controller and/or a differential pressure recorder controller operatively connected to a valve in a lower portion of a standpipe conveying fluidized catalyst from either or both of said regenerator and reactor, substantially as described.

I claim:

1. A method for converting a hydrocarbon in the presence of a fluidized catalyst which comprises in combination the steps as follows: (1) admixing said hydrocarbon with said catalyst and (2) conveying said admixture through a transfer pipe into a reactor vessel, maintained under hydrocarbon conversion conditions, and (3) maintaining a bed of dense phase hydrocarbon and catalyst mixture in said reactor for a time sufficient to convert said hydrocarbon, (4) removing spent catalyst from said bed into a transfer pipe, located in a substantially upright position below said reactor, (5) from said last-mentioned pipe by way of a withdrawal valve removing said catalyst into another transfer pipe for admixture with transport gases and (6) transporting the said admixture to a regenerator vessel, (7) in said vessel regenerating said catalyst under regenerating conditions, (8) withdrawing regenerated catalyst from said regenerator through a transfer pipe located in a substantially upright position below said regenerator, (9) passing said regenerated catalyst through a withdrawal valve from said last-mentioned pipe into said first-mentioned transfer pipe, (10) admixing said hydrocarbon for transfer to said reactor as described, (11) maintaining in each of said substantially upright positioned transfer pipes above said withdrawal valves therein a level of dense phase fluidized catalyst and controlling the level of the dense phase of fluidized catalyst in said pipes by means of a second valve in each of said pipes posititoned above each of said withdrawal valves by operating said second valves responsive to the pressure differential across each of said withdrawal valves, respectively, to maintain said pressure differential below a predetermined maximum.

2. A method according to claim 1 wherein the vertical distance of said second valve in each of said pipes is equal to $144(S-G)$ divided by D wherein S is equal to the differential pressure in pounds per square inch across said first-mentioned valve before installing said second valve and D is the density in pounds per cubic foot of the dense phase catalyst in said pipes and "G" is the minimum differential pressure in pounds per square inch across the second valve with the first valve completely open.

3. An apparatus suitable for the conversion of hydrocarbons comprising in combination a fluidized catalyst supply source; a reactor adapted to contain a bed of fluidized catalyst and hydrocarbon undergoing conversion; a standpipe in communication with said fluidized catalyst supply source and with a pipe which communicates with said reactor and which is adapted to convey hydrocarbon vapor and fluidized catalyst to said reactor; a withdrawal valve in a lower portion of said standpipe adapted to regulate flow of dense phase fluidized catalyst therefrom into said pipe communicating with said reactor; a temperature recorder controller operatively connected with an inner point of said reactor and with said valve; a second valve above said first-mentioned valve in said standpipe disposed above said first valve and adapted to regulate the level of dense phase within said standpipe above said first-mentioned valve but below said second valve; a differential pressure recorder controller operatively connected to said second valve to control said second valve responsive to the differential pressure across said first-mentioned valve; a second standpipe in communication with a lower portion of said reactor and with a pipe through which catalyst from said second standpipe can be conveyed to a catalyst supply source; a first valve in a lower portion of said second standpipe adapted to regulate flow of dense phase catalyst from said pipe; a second valve in said second standpipe above said first-mentioned valve adapted to control a level of dense phase catalyst in said second standpipe above said first valve but below said second valve; a differential pressure recorder controller adapted to control said second valve in said second standpipe and operatively connected with said second valve in said second standpipe to control the same responsive to the pressure differential across said first valve in said second standpipe; a differential pressure recorder controller operatively connected to said reactor and to said first valve in said second standpipe to control said first valve in said second standpipe responsive to the level of dense phase fluidized catalyst in said reactor.

4. An apparatus according to claim 3 wherein the vertical distance between the first valve and second valve in each of the standpipes is equal to $$\frac{144(S-G)}{D}$$

wherein S is equal to the differential pressure in pounds per square inch across said first-mentioned valve before installing said second valve and D is the density in pounds per cubic foot of the dense phase catalyst in said pipes and "G" is the minimum differential pressure in pounds per square inch across the second valve with the first valve completely open.

5. A method for conveying erosive fluidized solids from an upper level to a lower level through a conduit having a first variable flow control means which ordinarily is eroded by said solids as they pass therethrough which comprises providing in said conduit at a level above and removed from said first variable flow control means, a second variable flow control means, maintaining in said conduit between said first and said second variable flow control means a head of said erosive fluidized solids and controlling the vertical height of said head of solids responsive to the pressure drop across said first variable flow control means by means of said second variable flow control means so that said pressure drop remains below a predetermined maximum.

6. An apparatus for conveying downwardly a fluid from a reservoir of said fluid in which the fluid is maintained at a substantially constant level comprising in combination a substantially upright conduit in open communication with a lower portion of said reservoir and located substantially below said reservoir, a variable flow control valve in said conduit responsive to the level of said fluid in said reservoir and so connected operatively with respect to said reservoir as to maintain substantially constant the level therein, a flow control regulating valve disposed in a portion of said conduit upstream of and removed from said first-mentioned valve and means to control said flow control regulating valve responsive to the pressure drop across said variable flow control valve to at least partially close said flow control regulating valve when the pressure drop increases across said variable flow control valve beyond a predetermined maximum.

7. In combination, a vessel, adapted to contain a bed of fluidized solids, a pipe connected to a lower portion of said vessel and extending to a level substantially below its point of connection with said vessel so that fluidized solids will flow downwardly from said vessel therethrough, a first variable flow control valve in said pipe below said vessel operatively connected to said vessel and responsive to changes of level of fluidized solids therein, a second variable flow control valve in said pipe below said point of connection but above and removed from said first variable flow control valve and responsive to the pressure drop across said first variable flow control valve to at least partially close said flow control regulating valve when the pressure drop increases across said variable flow control valve beyond a predetermined maximum.

References Cited in the file of this patent
UNITED STATES PATENTS

| | | |
|---|---|---|
| 1,486,757 | Jensen | Mar. 11, 1924 |
| 1,787,686 | Kerr | Jan. 6, 1931 |
| 1,999,740 | Schmidt et al. | Apr. 30, 1935 |
| 2,422,793 | McAfee | June 24, 1947 |